United States Patent [19]

Bellamy, Jr. et al.

[11] 4,451,190

[45] May 29, 1984

[54] FASTENING ELEMENT AND A FASTENER ASSEMBLY USING THE SAME

[75] Inventors: Robert L. Bellamy, Jr., Richmond; James D. Bersot, Georgetown; Leonard Thomas K., Lexington; Richard R. Muse, Georgetown, all of Ky.

[73] Assignee: International Business Machines Corporation, Armonk, N.Y.

[21] Appl. No.: 301,992

[22] PCT Filed: Jun. 26, 1981

[86] PCT No.: PCT/US81/00877

§ 371 Date: Aug. 13, 1981

§ 102(e) Date: Aug. 13, 1981

[87] PCT Pub. No.: WO83/00197

PCT Pub. Date: Jan. 20, 1983

[51] Int. Cl.³ .............................................. F16B 21/00
[52] U.S. Cl. .................................... 411/337; 411/437; 411/908
[58] Field of Search ............... 411/437, 352, 337, 520, 411/511, 908

[56] References Cited

U.S. PATENT DOCUMENTS

| | | | |
|---|---|---|---|
| 2,824,480 | 2/1958 | Hotchkin | 411/437 |
| 3,212,391 | 10/1965 | Duffy | 41/352 |
| 3,362,278 | 1/1968 | Munse | 411/437 |
| 3,382,753 | 5/1968 | Tinnerman | 411/437 |
| 3,456,705 | 7/1969 | Tinnerman | 411/437 |

*Primary Examiner*—Wayne L. Shedd
*Attorney, Agent, or Firm*—William J. Dick

[57] ABSTRACT

Disclosed is a fastener assembly (10) and fastener (20) in which a post (11) includes a pair of recesses (14a, 14b) for mating engagement with a pair of inwardly extending projections (32a, 32b, 42a, 42b) on a nut-like fastener (20). The structure of the coating assembly (10) allows for sliding relative movement between the nut-like fastener (20) and the post (11) when the nut (20) and post (11) are in a first orientation, and when reoriented permits the harder projections (42a, 42b, 32a, 32b) to cut into the post and thereby inhibit disengagement of the nut (20) from the post (11) until the first reorientation is reobtained.

6 Claims, 7 Drawing Figures

FASTENING ELEMENT AND A FASTENER ASSEMBLY USING THE SAME

TECHNICAL FIELD

The present invention relates to fasteners and fastener assemblies and more particularly to quick acting reusable fasteners and fastener assemblies.

STATE OF THE PRIOR ART

There are numerous fastening devices exemplified in the prior art. Each of the devices has its own specific use which gives it advantages and disadvantages. For example, many of the fastening devices, because of their complexity, are difficult to manufacture leading to an increased cost of the product. Other fastening devices are difficult in assembly, again leading to an increased cost to the user when putting the fastening device to its intended use or purpose. Many of the fastening devices, exhibited in the prior art, exhibit insufficient strength for heavy duty use, their usage being intended primarily for light and quick simple fastenings, while other devices have limitations which effect their clamping ability under stress or vibrations. What is chiefly desired in a fastener assembly and fastener is ease of manufacture, reduction in cost of the product; ease in assembly by the user while retaining strength for heavy duty usage, and most important the ability to clamp, if such is desired, parts together.

Exemplary of the prior art is U.S. Pat. No. 3,023,473, issued on Mar. 6, 1962 to Cochran. This device illustrates a fastening clip formed from a single piece of metal in which plate-like portions including a finger operable fastener element, slide over the end of a shaft or the like which has a square cross-section. When the clip is rotated relative to the shaft, the lower-most aperture engages and gouges into the side-wall of the post, while the upper aperture of the plate-like element now fits the rectangle or cross-sectional post preventing further motion, and locking of the fastening device in its intended position. Thus the orientation of the apertures in the plate-like portions is rotated by 45° to effect a locking action.

Other references, such as GB-A-912,083 are illustrative of a snap ring which moves into a groove on the post, or GB-A-846,015 which cuts a spiral groove in the stud which is not recessed nor does it include quick acting snap on for the same, as in the device of the present invention. Other devices, such as U.S. Pat. No. 974,059 to Haynes (1910) are illustrative of two-piece type fasteners requiring an element of the fastener assembly to be rotated with respect to another portion of the assembly so as to effect engagement with a serrated or other preprepared post.

SUMMARY OF THE INVENTION

In view of the above, it is a principle object of the present invention to provide a fastener and fastener assembly which is easy to manufacture, will allow for quick assembly, is strong enough for heavy duty usage and have effective clamping ability under varied usage conditions.

The fastener assembly of the present invention includes a post having at least a pair of longitudinally extending recesses therein for mating engagement with at least a pair of inwardly extending projections on a nut-like fastener. The structure of the co-acting assembly allows for sliding relative movement between the nut-like fastener and post when the nut and post are in a first orientation. Once the nut-like fastener is in the desired longitudinal position relative to the post, the nut is reoriented, which permits the harder projections of the nut to cut into the post and thereby inhibit disengagement of the nut from the post until the first orientation is reobtained. The preferred embodiment includes a double apertured nut with spaced apart, upper and lower portions which give increased locking strength of the nut to the post. Moreover, if desired, by simply making the plane of the contact of the surface associated with one of the apertures of the nut from the other aperture, the nut may be inverted and a new locking position achieved on the post for the projections. A feature of the invention includes a double wedge or ramp construction associated with the cutting edge to lock the nut in engagement with the post.

In the preferred mode of the present invention, both the upper and lower portions of the fastener (nut-like element) are adapted for gouging engagement with a post. Moreover, the post and nut-like element have interengaging recesses and projections which permit a sliding action of the nut-like element to any longitudinal position on the post, the plate-like element not being confined just to the upper portion of the post as in the Cochran device.

DETAILED DESCRIPTION OF THE INVENTION

Figure 1:
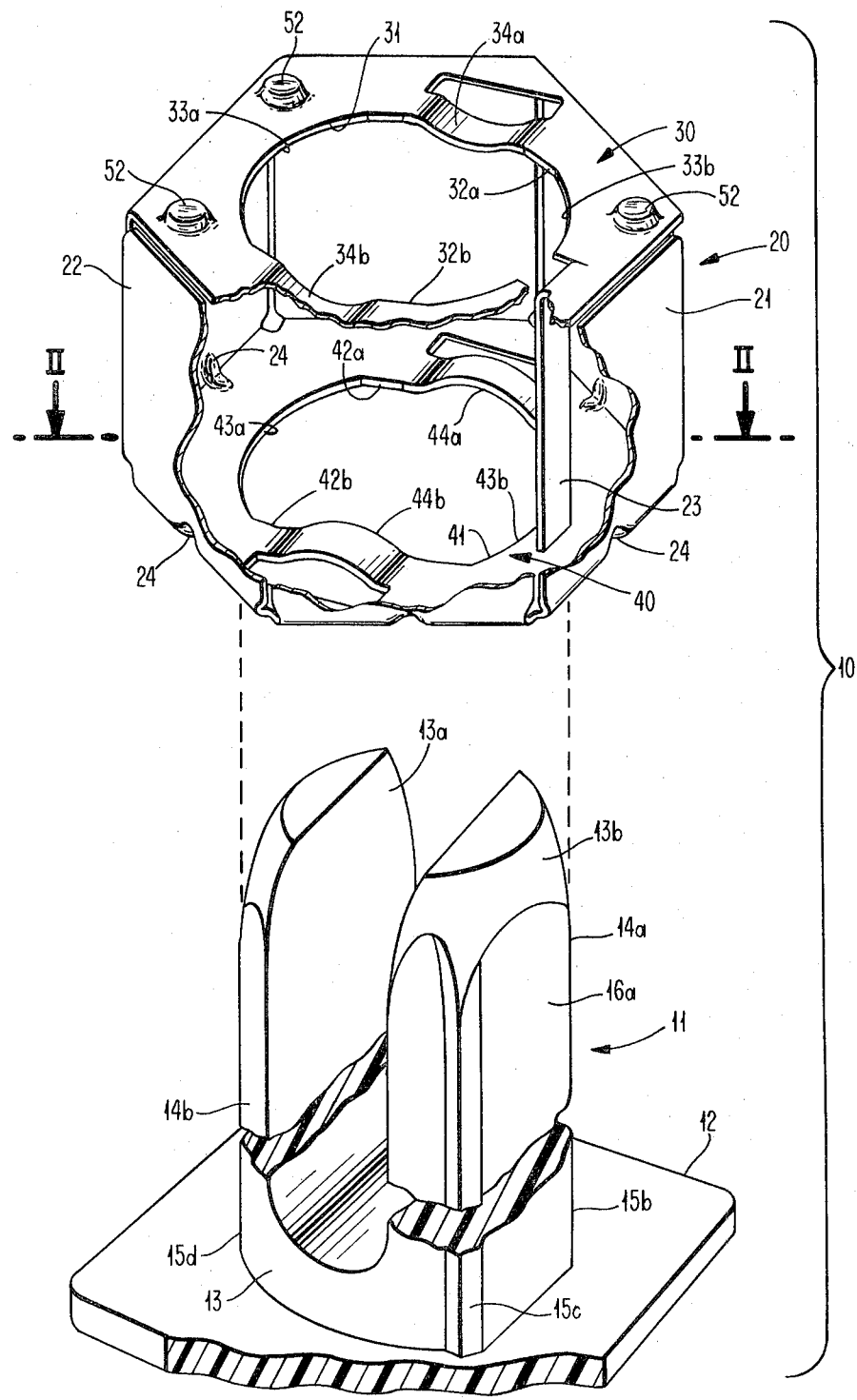
FIG. 1 is an exploded, fragmentary perspective view of a fastener assembly constructed in accordance with the present invention.

Referring now to the drawings, and especially FIG. 1 thereof, a fastener assembly 10 constructed in accordance with the present invention is illustrated therein. The fastener assembly 10 includes a post 11 and a novel nut-like fastener 20, the fastener 20 adapted, when in the orientation illustrated in FIG. 1, to slide easily over the post 11 until a desired distance is reached from the bottom of the fastener 20 to the head end 12 of the post. The fastener 20 is then rotated into a second orientation which effects cutting into the post material and a wedging of the fastener 20 onto the post to thereby inhibit separation of the fastener from the post and clamp for example, a work piece or other element (not shown) between the lower portion of the fastener and the head 12 of the post.

Figure 2A:
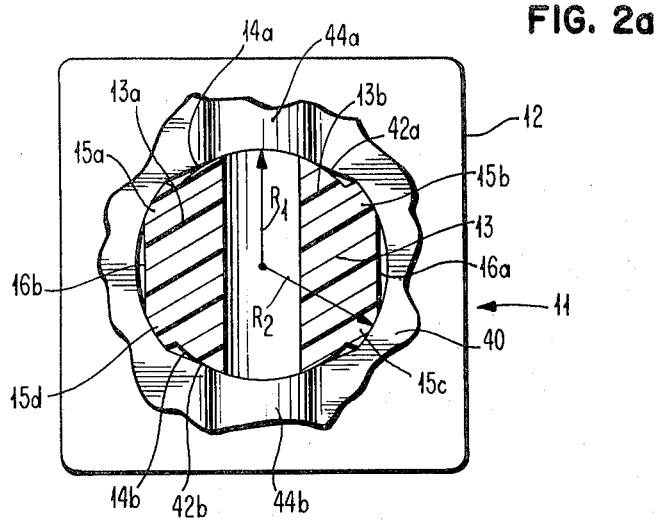
FIGS. 2a-2c is a fragmentary sectional view taken along line II—II of FIG. 1 and illustrating the position of the nut-like fastener relative to the post in three different positions.

To this end, and referring now to FIGS. 1 and 2a, the post 11 includes a shank portion 13, in the illustrated instance the shank being bifurcated to form upstanding leg portions 13a, 13b. The post 11 preferably includes a pair of longitudinally extending recesses 14a, 14b disposed on opposite longitudinal surfaces of the shank 13. The recesses merge into oppositely disposed longitudinally and radially outwardly extending wall portions 15a, 15b, 15c, and 15d. Preferably the recesses 14a and 14b lie on the arc of a circle having a radius R1, while the longitudinally and radially extending wall portions 15a–15d lie on a circle having a radius R2, the radius R2 being greater than the radius R1. (See FIG. 2a.)

For reasons which will become more clear hereinafter, in the preferred post form, the adjacent wall portions 15b–15c and 15a–15d merge into flats or relieved portions 16a, 16b.

The post 11 is preferably composed of a ductile material having a first hardness less than the hardness of the fastener 20. For example, the post may be a molded thermoplastic material, such as a polycarbonate, polypropylene etc.

As set forth heretofore, the fastener element 20 is designed for sliding engagement with the post when the nut-like fastener 20 is in a first orientation, and then for biting engagement with the post when the orientation is changed by relative rotation between the fastener and the post. To this end, and referring now to FIGS. 1 and 2a, the nut-like fastener 20 includes a body portion 21 including, in the preferred embodiment, spaced apart upper and lower portions 30, 40. Each of the upper and lower portion 30, 40 include means 31, 41 defining an aperture therein dimensioned for sliding engagement, when in a first orientation, with the post 11, and for biting into the post when the fastener 20 is placed in a second orientation, in the present instance by rotation.

To this end, and referring to FIGS. 1 and 2, each of the apertures 31 and 41 includes a pair of radial, inward projections 32a, 32b and 42a, 42b. The projections are aligned longitudinally of the fastener and are dimensioned apart for coactive engagement in the recesses 14a and 14b of the post 11. Moreover, as more clearly illustrated in the drawing, the projections merge into arcuate portions 33a, 33b, 43a, 43b which are dimensioned (have a diameter) slightly larger than the twice the radius R2 so as to clear the wall portions 15 of the post 11. This permits the fastener 20 to easily pass longitudinally down the post 11 when in a first orientation such as illustrated in FIG. 2a.

The fastener 20 is preferably made from a single one piece stamping or a like operation out of metal, the sidewalls 22 being bent upwardly (or downwardly as the case may be) to form suitable sidewall support for the bent over upper portion 30. Increased support between the upper and lower portions 30 and 40 may be effected by bending a strut like support member 23 from one of the surfaces. Moreover, during the forming (bending) operation, gussets 24 may be formed along the intersections of the sidewalls 22 and the lower portion 40 of the fastener 20 to increase strength and rigidity of the fastener.

During fabrication of the fastener 20, it is desirable, for purposes which will become more clear hereinafter, to provide in the projections 32a, 32b, 42a, 42b ramp like portions 34a, 34b, 44a, 44b. In the illustrated instance, the ramp like portions may be formed by a dimpling or forming die which effects a protrusion of the metal of the upper and lower portions 30 and 40 to effect upwardly facing protrusions 44a, 44b in the lower portion 40 and downwardly projecting protrusions 34a, 34b in the upper portion 30.

As set forth heretofore, the nut-like fastener when in the orientation illustrated in FIG. 2a permits the fastener 20 to slidingly engage the post 11. The fastener may be pushed onto the post with the projections coacting with the recesses until a work member (not shown) is captured between the post head end 12 and the lower portion 40 of the fastener 20. At that time relative rotation may be effected between the post and fastener 20 to alter the orientation and lock the fastener to the post.

Figure 2B:
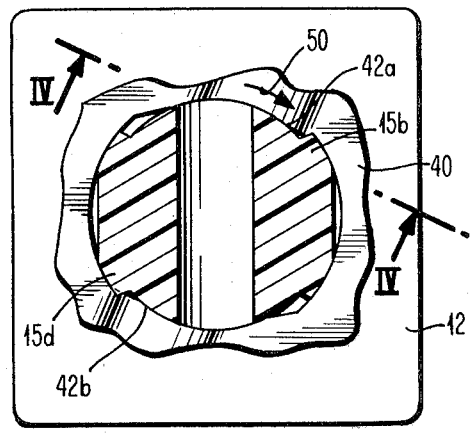
Figure 2C:
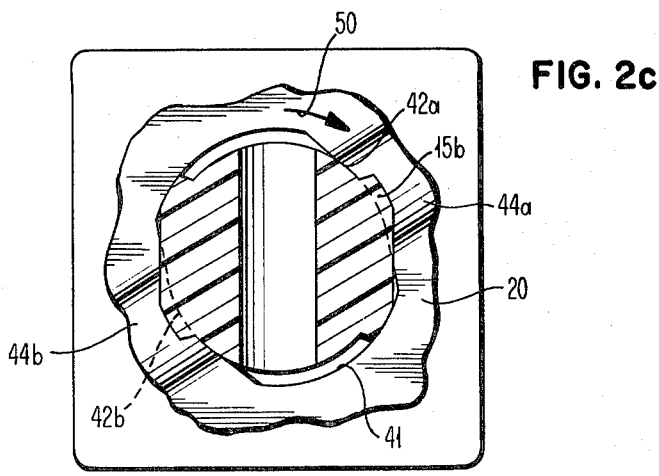
Figure 4:
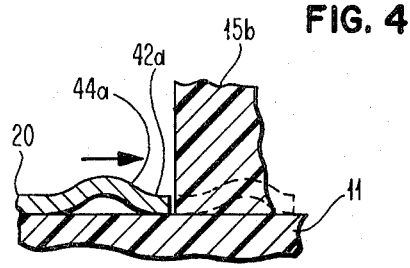
FIG. 4 is a fragmentary sectional view taken along line IV—IV of FIG. 2b.

To this end, and referring to FIGS. 2a–2c the fastener is shown being rotated in a clockwise direction as in the direction of the arrow 50. Inasmuch as the projection has an internal diameter slightly smaller than 2×R2 (R2=the radius of the wall portion of the post 11) the projection 42a tends to bite into the wall portion 15b while simultaneously the projection 42b tends to bite into the wall portion 15d. This occurs because the post element is of a first hardness less than the hardness of at least the projections 42a, 42b, 32a, 32b associated with the lower and upper portions 40 and 30 of the fastener 20. Continued rotation of the fastener 20 into the wall portions 15 such as illustrated in FIG. 4 causes the ramp 44a on the lower portion 40 of the fastener 20 to move into the grooved portion of the post caused by the leading edge of the projection 42a, effecting a material displacement and, to some extent a minor deflection of the ramp like portion creating a wedging action. The wedging action of the ramp like portion tends to lock the fastener into position. It should be recognized that the like construction of both the upper and lower portions 30, 40 of the nut-like fastener 20 cause an identical action to occur at spaced apart points on the post effecting a firm, stable, locked condition.

If rotation of the nut-like fastener continues, the ramp portions will pass through the wall portions 15 causing the projections to "bite" into the adjacent wall portions. However, because of the flats 16a, 16b on the post 11, the ramp portions will be released from engagement with the wall portions, and the operator will perceive a tactile feedback because of looseness of the nut-like fastener. This "looseness" is in the form of ease of rotation of the fastener and a "wobbly" like feel.

It should be apparent from the foregoing that rotation of the fastener 20 in the opposite direction will effect realignment of the projections 42a, 42b, 32a, 32b with their associated recesses 14a, 14b of the post 11. In this manner easy removal of the fastener is effected by merely sliding the fastener up the post to release any work piece or element captured between the fastener and the head end 12 of the post.

Moreover, it should also be readily apparent that in the event that the fastener assembly is to be reused, simple rotation of the nut-like fastener in the opposite direction will cut a new groove into the wall portions 15a and 15c which had not been cut before. Thus it is possible to reuse the post and nut-like fastener.

In accordance with another feature of the invention, and referring to FIG. 1, it is possible to offset the upper portion 30 of the nut-like fastener 20 from the position where it engages a work piece like element so that new grooves are formed in the wall of the post so that the post and nut-like fastener 20 may be reused if fastening and unfastening has been accomplished more than twice. For example, and as illustrated in FIG. 1, lugs or dimples 52 may easily be formed into the upper portion 30 during fabrication so that upon turning the nut-like fastener over and reinserting the same onto the post will permit engagement of a virgin portion of the post by the projections 32a, 32b, 42a, 42b. In this position, the lugs 52 engage the work piece offsetting the projections 32a, 32b, 42a, 42b from their former position when the position of the nut-like fastener was first placed upon the post such as illustrated in FIG. 1.

The preferred fastener assembly illustrated in FIG. 1 lends itself to such use as fastening a typewriter keyboard and the like to the base plate or frame of the typewriter. In that instance, the posts 11 may be formed on a strip which is connected to the base plate, there being a plurality of such posts projecting in a manner which allows them to mate with, for example, apertures in the keyboard plate. Simple application then of the nut-like fasteners will permit semi-permanent attachment of the keyboard to the base of the typewriter. Of course removal in a quick and easy fashion is then facilitated by merely rotating the nut-like fasteners 45° preferably counterclockwise, in the illustrated instance, for removal of the keyboard.

Figure 3:
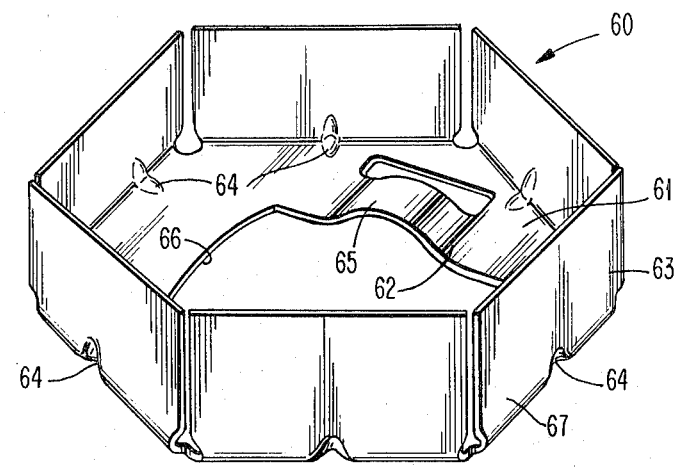
FIG. 3 is an enlarged perspective view of another embodiment of the fastener of the present invention.

In another embodiment of the invention, in which light duty usage does not require the upper and lower portion of the nut-like fastener, a single stamping may be made to form a nut-like fastener such as illustrated in FIG. 3. In this embodiment, the nut-like fastener 60 includes a single base portion 61 including means defining an aperture 66 having a pair of projections 62 adapted to mate with like recesses in a post such as heretofore described. In this embodiment, the fastener has a body portion 67 including upstanding walls 63 which include stiffening gussets as at 64 and the same ramp like projection 65 as heretofore described relative to FIGS. 1 and 2.

Moreover, the structure of FIG. 3 has an additional advantage. The ramp 65, by forming it upwardly creates a downward wedging action of the nut-like fastener 60, effecting a further tightening of the fastener against the work piece. Such a downwardly directed wedging action is by-and-large cancelled in the embodiment of FIGS. 1 and 2 because the ramps of the upper portion have a direction which is opposed to the direction of the ramps of the lower portion. Of course it should be recognized that if the ramps 32a and 32b are reversed so as to project in the same direction as ramps 42a, 42b, then such a construction would also achieve an increase in downward force against a work piece.

Figure 5:
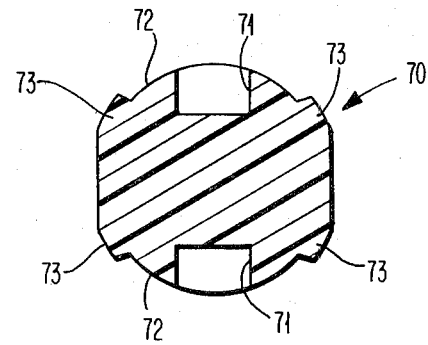
FIG. 5 is a cross-sectional view of another post configuration constructed in accordance with the present invention.

It should be also recognized that the post structure may be varied from that which has heretofore been described. For example, referring now to FIG. 5, the post 70 illustrated therein may be molded with a simple cutout groove 71 extending longitudinally of the post on opposite sides thereof with similar recesses 72 therein and wall portions 73 as described with reference to the post 11. However, the bifurcation of the post 11 helps in molding, because less material is used, and some inward deflection may be experienced to aid in the clamping and locking purposes of the nut-like fastener when the nut is moved from its first orientation to its second orientation for locking engagement. Accordingly, the post structure illustrated in FIGS. 1 and 5 may even be further modified to include a solid section as opposed to any grooves or bifurcations such as illustrated in those figures.

Although the invention has been described with a certain degree of particularity, it is understood that the present disclosure has been made only by way of example and that numerous changes in the details of construction and the combination and arrangement of parts may be made without departing from the spirit and scope of the invention as hereinafter claimed.

What is claimed is:

1. A fastener assembly (10) for clamping at least one element, said fastener assembly being of a type having an aperture and post gouging portion, said fastener assembly characterized by:
   a longitudinally extending post (11,70) including at least a pair of longitudinally extending recesses (14a,14b,72) therein;
   said post (11,70) material having a first hardness;
   a fastener element (20,60) for mating engagement with said post (11,70) to form said assembly (10), said fastener element (20,60) comprising a body portion (21,63) having means defining an aperture (31,41,66) therein dimensioned for sliding engagement with said post (11,70) when in a first orientation and for biting engagement with said post (11,70) when the orientation is changed by relative rotation between said fastener element (20,60) and said post (11,70);
   said fastener element (20,60) including projections (32a,32b,42a,42b,62) extending inwardly and positioned for coactive engagement in said recesses (14a,14b,72) of said post (11,70) to permit sliding relative movement between said post (11,70) and said fastener element (20,60);
   at least said projections (32a,32b,42a,42b,62) being of a second hardness greater than said first hardness whereby said projections (32a,32b,42a,42b,62) bite into said post (11,70) to inhibit separation of said fastener element (20,60) from said post (11,70) upon relative rotation from said first orientation, said projections (32a,32b,42a,42b,62) including a ramp (34a,34b,44a,44b,65) for effecting a wedging action between said fastener element (20,60) and said post (11,70).

2. A fastener assembly (10) in accordance with claim 1 further characterized in that said fastener element (20) includes spaced apart upper and lower portions (30,40) each having apertures therein and axially aligned projections (32a,32b,42a,42b) to permit axially spaced apart clamping of the element (20) to the post (11,70) by said aligned projections when said element (20) is in other than said first orientation.

3. A fastener assembly 10 in accordance with claims 1 or 2 wherein said ramp (34a,34b,44a,44b,65) comprises an axially extending protrusion in said projections.

4. A fastening element (20,60) for use in clamping one or more elements to a longitudinally extending post (11,70) having at least a pair of longitudinally extending recesses (14a,14b,72), said fastening element (20,60) characterized by:
   a nut-like member (20,60) including an aperture (31,41,66) therein dimensioned for sliding engagement with said post (11,70) when in one orientation and for interference with said post (11,70) when in other than said one orientation;
   said nut-like member (20,60) including projections (32a,32b,42a,42b,62) in said aperture (31,41,66) dimensioned for unimpeded sliding movement in said recesses (14a,14b,72), said projections (32a,32b,42a,42b,62) being harder than said post (11,70) so that upon relative rotation of said nut-like member (20,60) said projections (32a,32b,-42a,42b,62) engage and bite into the post material thereby inhibiting axial displacement and separation of said fastening element (20,60) from said post (11,70), said projections (32a,32b,42a,42b,62) including a ramp (34a,34b,44a,44b,65) for effecting a wedge like action between said ramp and said post when said projections are in engagement with said post.

5. A fastening element (20) in accordance with claim 4 further characterized in that said nut-like member (20) includes spaced apart upper and lower portions (30,40) each having apertures (31,41) therein and axially aligned projections (32a,32b,42a,42b) to permit spaced apart clamping of the nut-like member (20) to the post (11) when said member (20) is in other than said one orientation.

6. A fastening element (20,60) in accordance with claims 4 or 5 further characterized in that said ramp (34a,34b,44a,44b,65) includes an axially extending protrusion in said projections.

* * * * *